July 31, 1934.    D. GEORGE    1,968,036
TOOL FOR FORMING CONTAINERS
Filed Dec. 10, 1930    9 Sheets-Sheet 1

D. George
INVENTOR
By Marks & Clerk
ATTYS.

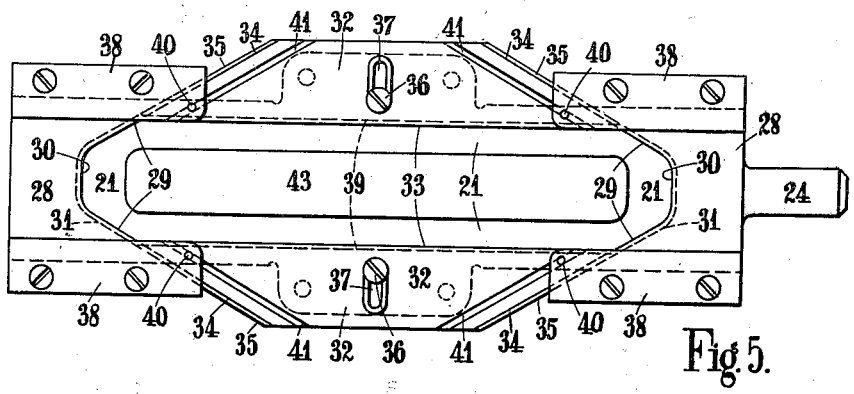
Fig.5.
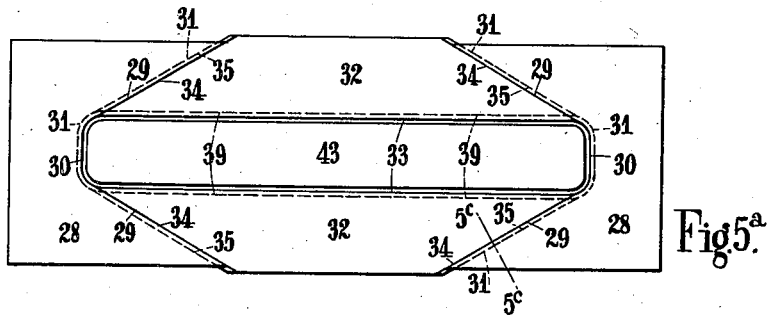
Fig.5.ª
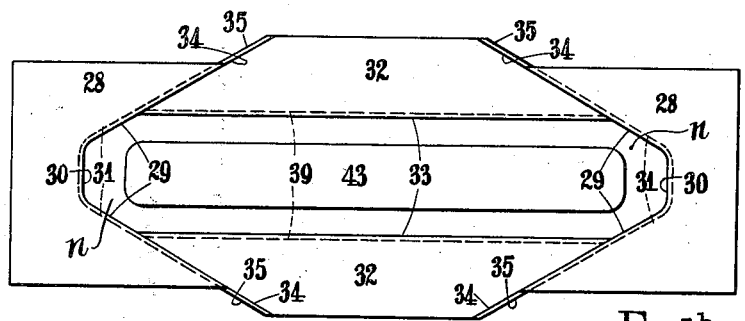
Fig.5.ᵇ
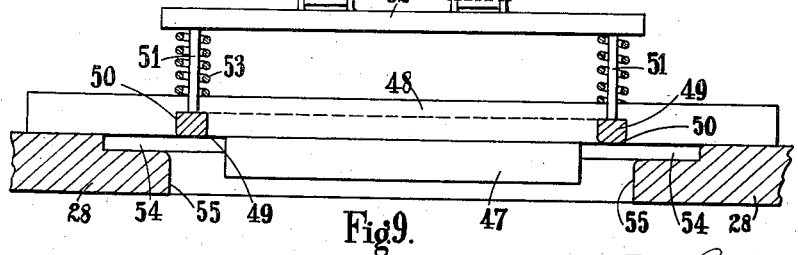
Fig.9.

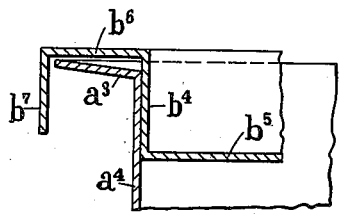
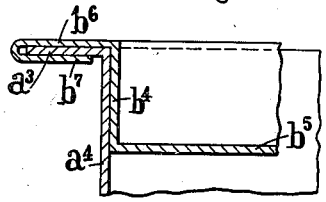
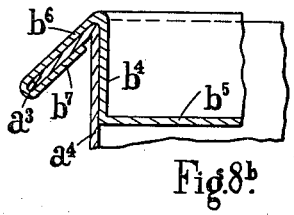
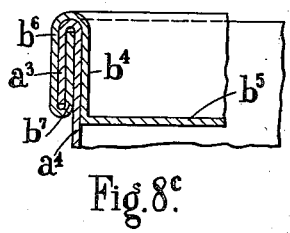
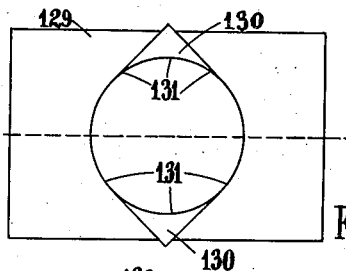
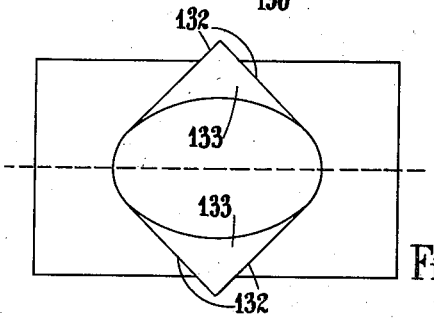
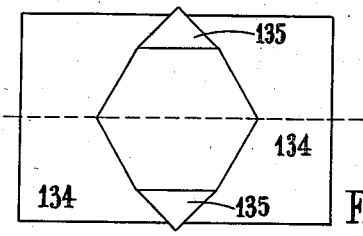
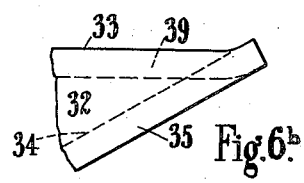
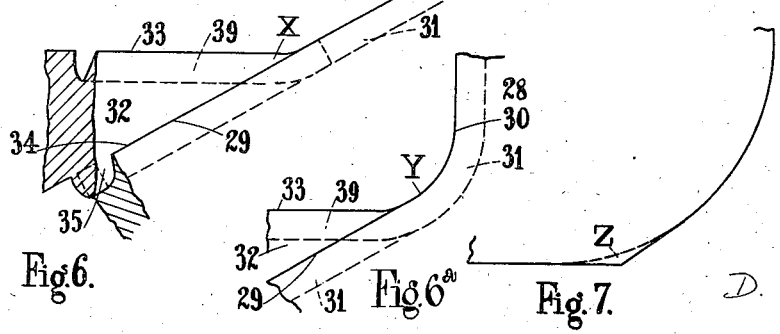

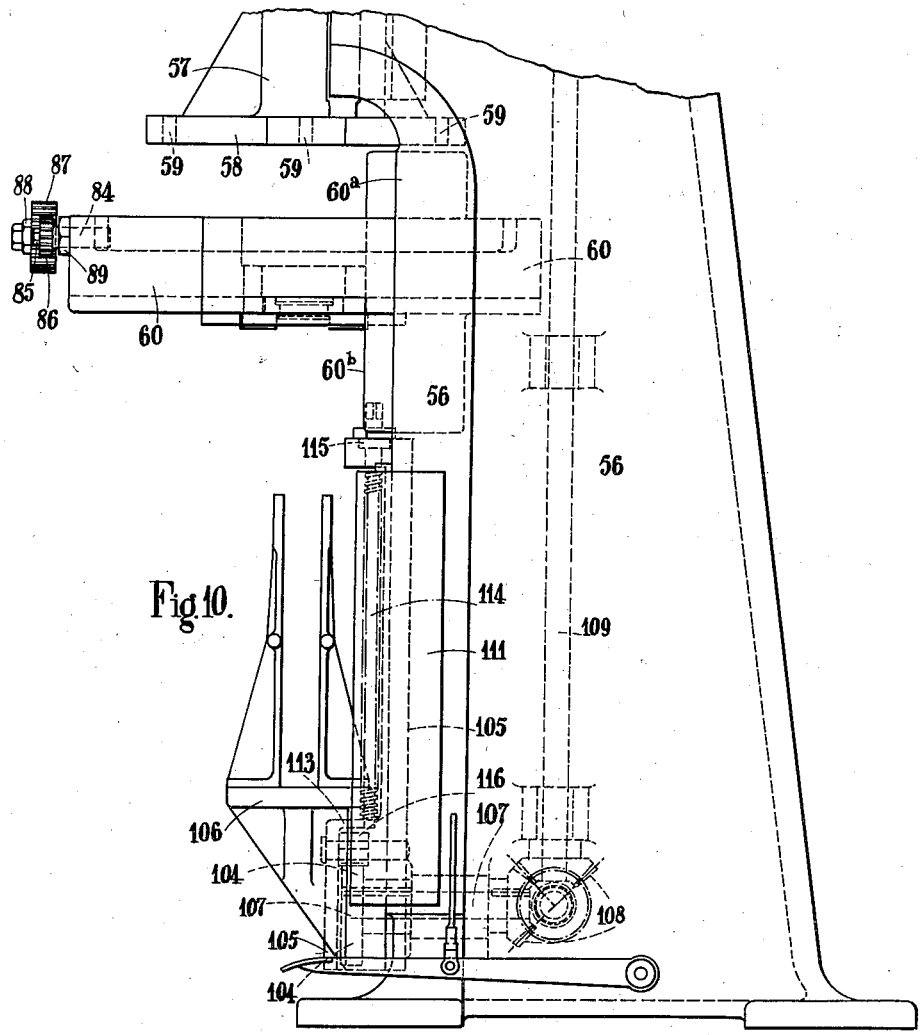

July 31, 1934.                D. GEORGE                1,968,036
                       TOOL FOR FORMING CONTAINERS
                       Filed Dec. 10, 1930      9 Sheets-Sheet 6
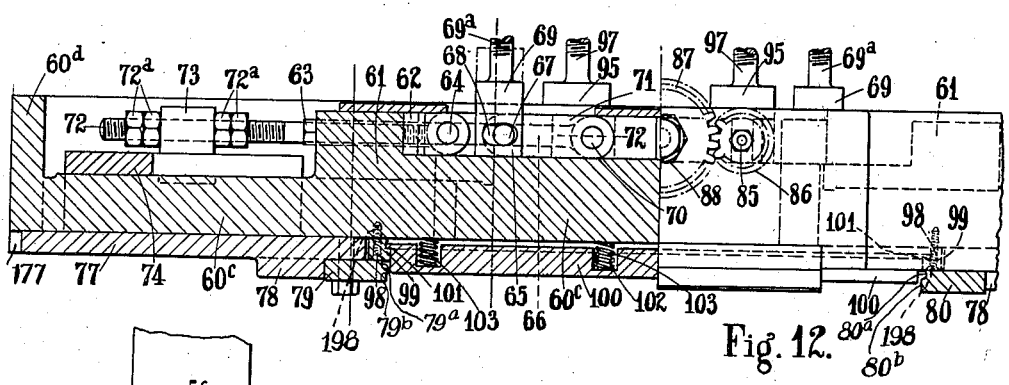
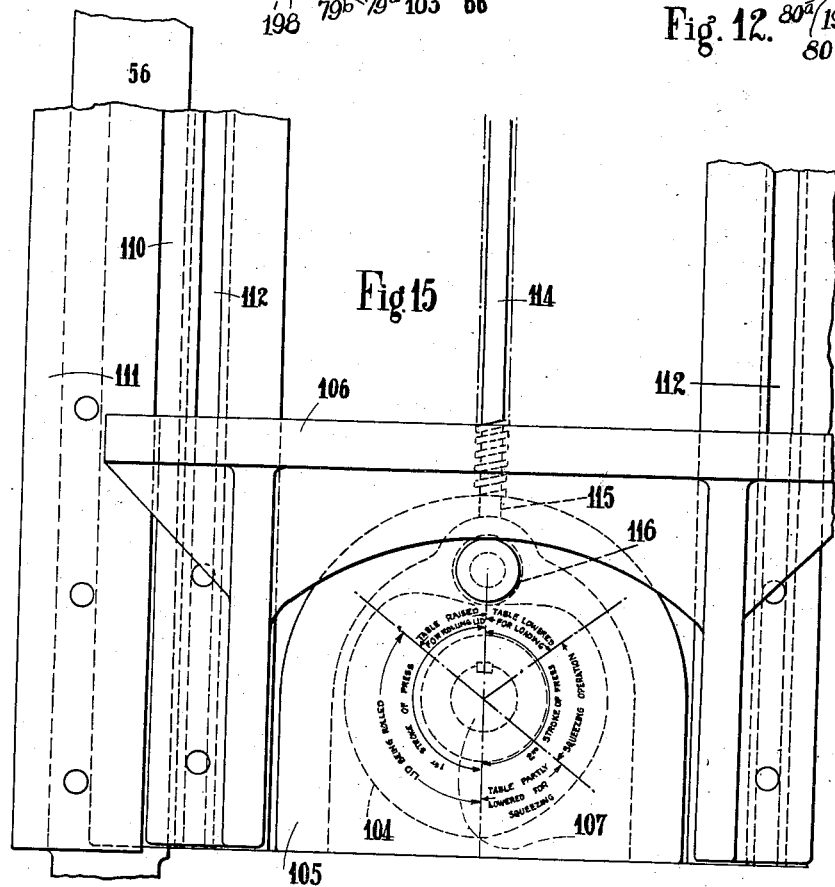
D. George, Inventor
By: Marks & Clerk, Attys.

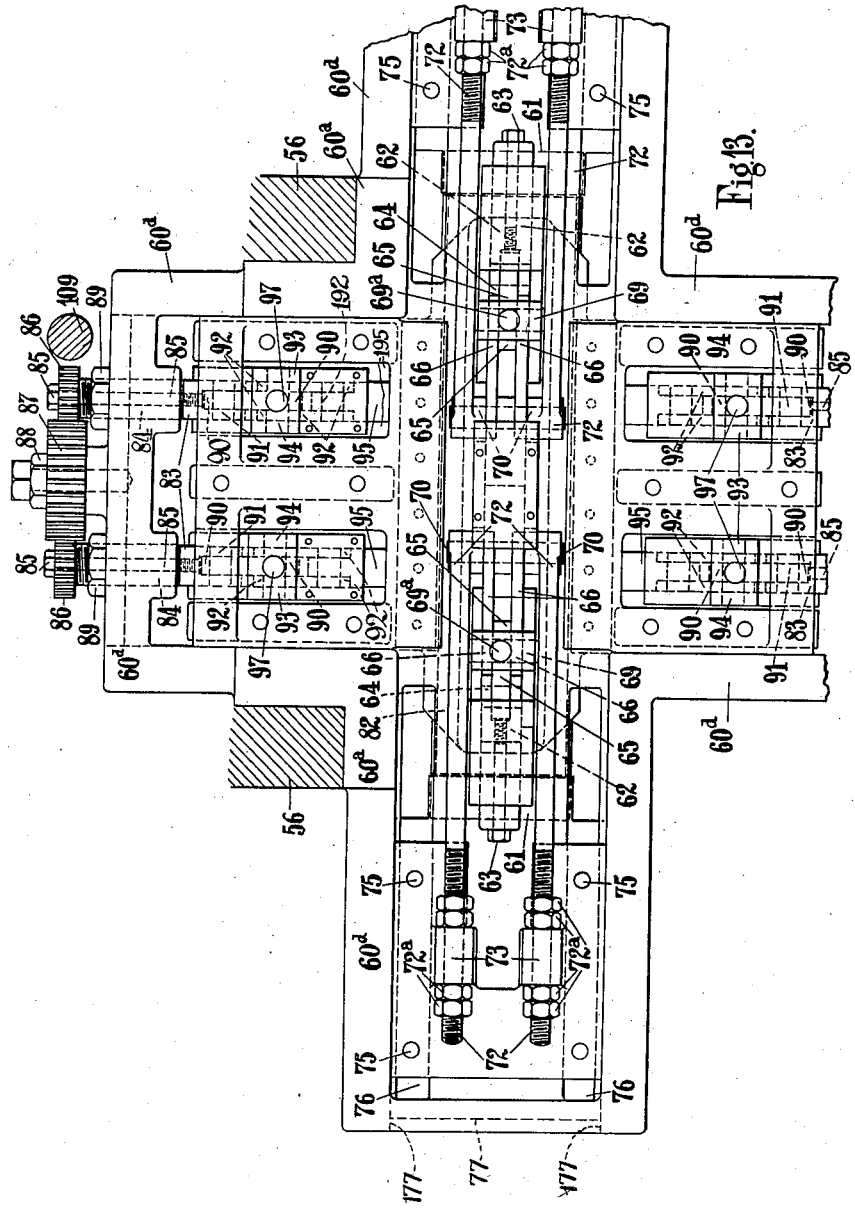

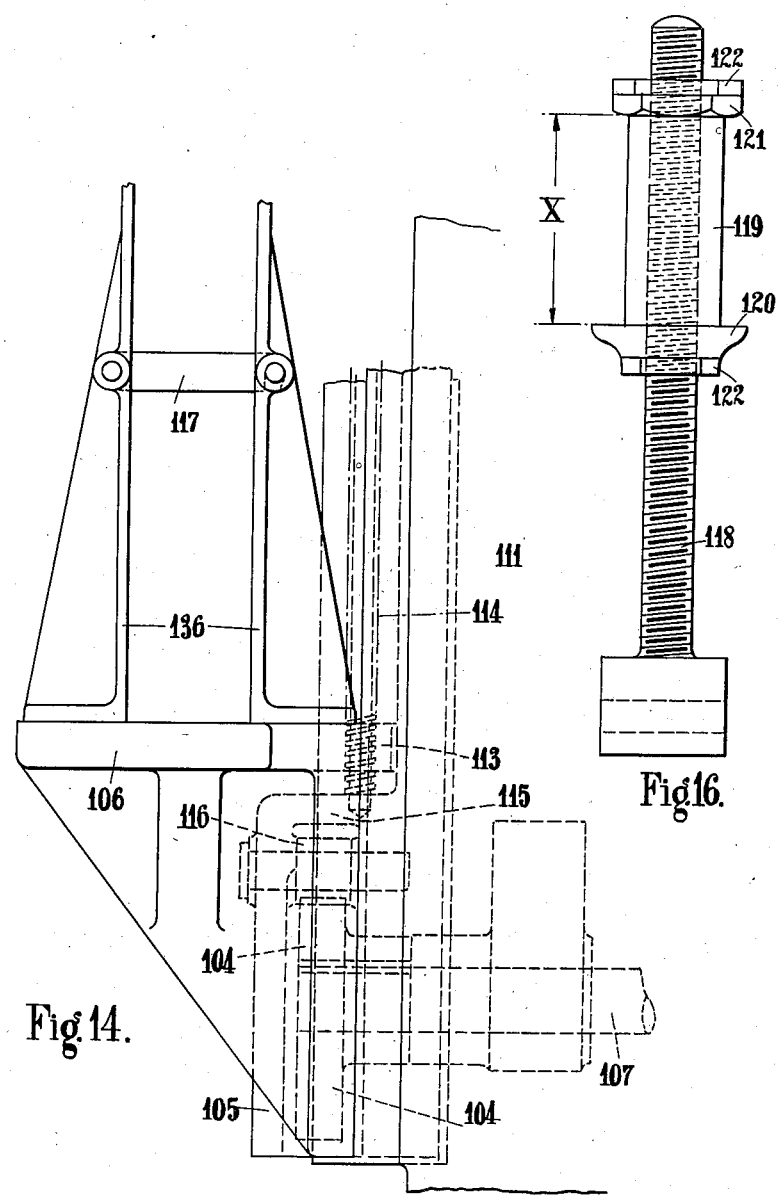

July 31, 1934.  D. GEORGE  1,968,036
TOOL FOR FORMING CONTAINERS
Filed Dec. 10, 1930   9 Sheets-Sheet 9
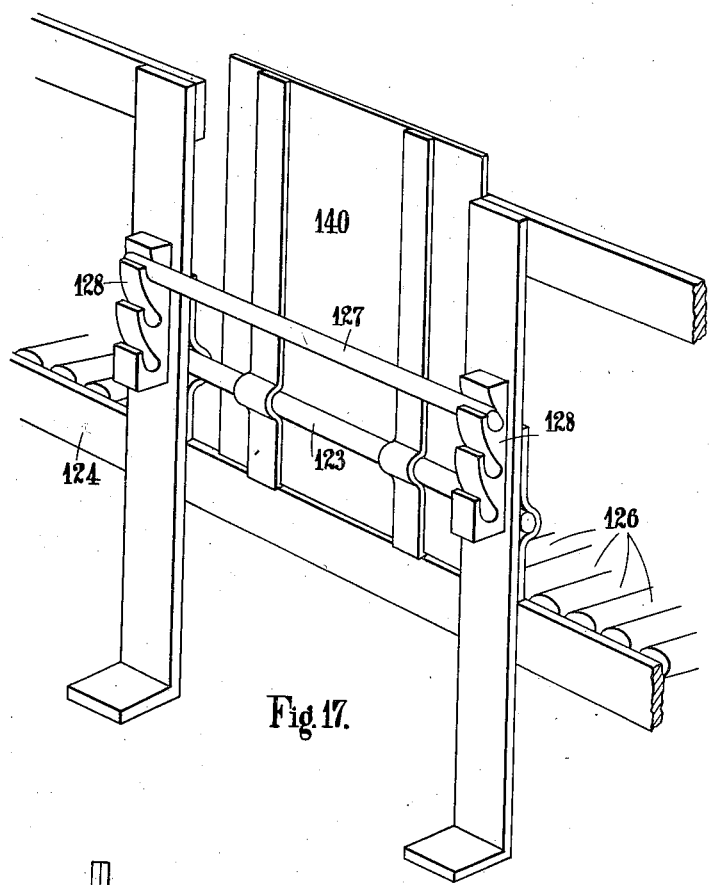
Fig. 17.
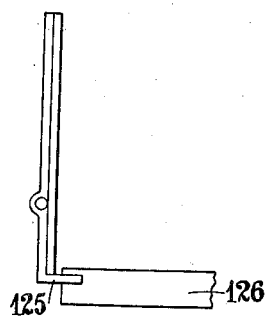
Fig. 17ᵃ.
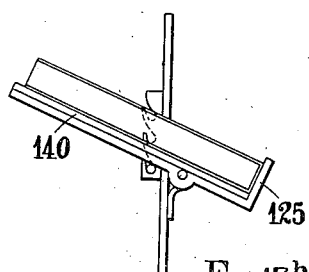
Fig. 17ᵇ.
D. George
INVENTOR
By: Marks & Clerk
ATTYS.

Patented July 31, 1934

1,968,036

UNITED STATES PATENT OFFICE 1,968,036

TOOL FOR FORMING CONTAINERS

David George, Swansea, Wales, assignor to "Shell" Marketing Company, Limited, London, England Application December 10, 1930, Serial No. 501,455
In Great Britain December 20, 1929

19 Claims. (Cl. 113—18)

This invention relates to machines or tools for use in the manufacture and closing of containers, packing cases or the like of the type comprising a body or central portion of tubular form and flanged end-pieces which are recessed and are inserted into the open ends of the body portion, the flanges of the end-pieces then being rolled or seamed together with the adjacent marginal portions of the body portion.

A container of this type is disclosed in prior British specification No. 295,642 and adapted for the boxing of tin or like plates or other relatively heavy articles, the container being formed of sheet metal of a fairly substantial gauge.

An object of the invention is to provide improved machines or tools for the construction of and closing of containers of the type described whereby the cost of production is considerably reduced.

A further object is to provide an improved apparatus particularly adapted to deal with containers of the type described and used for boxing tin plates, that is, containers having a flat cross sectional shape.

By the phrase "body portion of tubular form" as used in this specification, it is intended to cover a body portion formed originally as an open-ended element whatever the length of the wall of such element as measured between the open ends thereof. For example, the invention may be applied to containers of which the height is much less than the length or breadth.

Where, in the following description, reference is made to the axis of the container, this is intended to refer to the longitudinal axis, i. e. an axis parallel to the sides of the body portion. Further the term jaw when such is used in this specification, is intended to refer to the member or part which engages the parts of the container and end piece to roll or fold them together.

The invention consists in a tool for attaching an end piece to the body portion of a container of the type described, wherein a double seam is formed outwardly of the plane of the walls of the container comprising a plurality of pairs of work engaging jaws having operating surfaces, the jaws in each pair being oppositely disposed one to the other, adjacent jaws having surfaces in sliding engagement with one another, whereby a continuous operating surface is provided in all positions of the jaws, and means for moving the jaws inwardly to perform a seaming or folding operation, the inward movement of the opposed jaws in each pair being along their common axis.

According to a further feature, the roll may be flattened or planished and this may be effected by an axial displacement of the tool (except the chuck hereinafter mentioned) relatively to the container, and the subsequent motion of the jaws inwardly to engage and flatten or planish the roll into a flat seam.

According to a modification in which the roll-forming step is dispensed with, the first inward movement of the jaws is utilized to cause a fold-ing of the marginal portion of the end-piece, to lie beneath and in plane contact with the marginal flange of the body portion forming a compound flange of three thicknesses of metal hereinafter referred to as the triple flange), which triple flange is then bent down towards and at an angle with the body portion and lastly pressed or planished against all the sides of the body portion simultaneously by a second inward movement of the jaws.

The tool may comprise a pair of end jaws and a pair of side jaws, the end jaws having surfaces inclined to the direction of movement thereof and engaging complementary surfaces on the side jaws, and means for moving the end jaws toward or away from one another, the arrangement being such that the inward movement of the end jaws causes inward movement of the side jaws through the engagement of the inclined surfaces.

The outward movement of the side jaws may be effected by the engagement of pins or projections associated with the end jaws engaging grooves in the side jaws.

The tool is provided with a chuck located inwardly of the jaws and mounted so as to move in a direction perpendicular to the plane of the inward and outward motion of the jaws.

In the case of a power-operated plant it is preferred to move the jaws (both side and end) by toggle devices which are linked up to the head of a power press.

In the particular application of the invention to the packing of tin plates or the like, the container will be oblong in cross section and provided along the longitudinal edges with suitable curves whereby a continuous roll or seam may be formed.

According to the preferred arrangement the operative faces of the side and end jaws are formed with curved portions which coincide or merge into one another to form a continuous curved wall concentric with the curve of the corner of the container (when the jaws occupy the "in" or roll-forming position) such curves, when the jaws occupy the "out" position, merging into and being continuous with, and joined by common tangents.

Further features of my invention will be hereinafter described.

In the accompanying drawings:—

Figure 4 is an end elevation partly in section, the section being taken on the line 4—4 of Figure 2.

Figure 5 is an inverted plan of the device shown in Figure 2.

Figures 5a, 5b are diagrams showing the side and end jaws respectively at the inner limit of their working travel and at the outer limit of their working travel.

Figure 5c is a section on the line 5c—5c of Figure 5a.

Figure 5d is a detail, similar to Figure 5c, of a modification.

Figures 6, 6a and 6b are diagrams showing a preferred form of the jaws or dies whereby a continuously curved roll is formed.

Figure 7 shows diagrammatically a modified form of chuck.

Figure 7a shows a detail of a side jaw.

Figures 8, 8a, 8b and 8c diagrammatically illustrate steps in the operation of a modified method according to the invention.

Figure 9 diagrammatically illustrates in elevation partly in section an apparatus used in the method according to Figures 8, 8a, 8b, and 8c.

Figure 11:
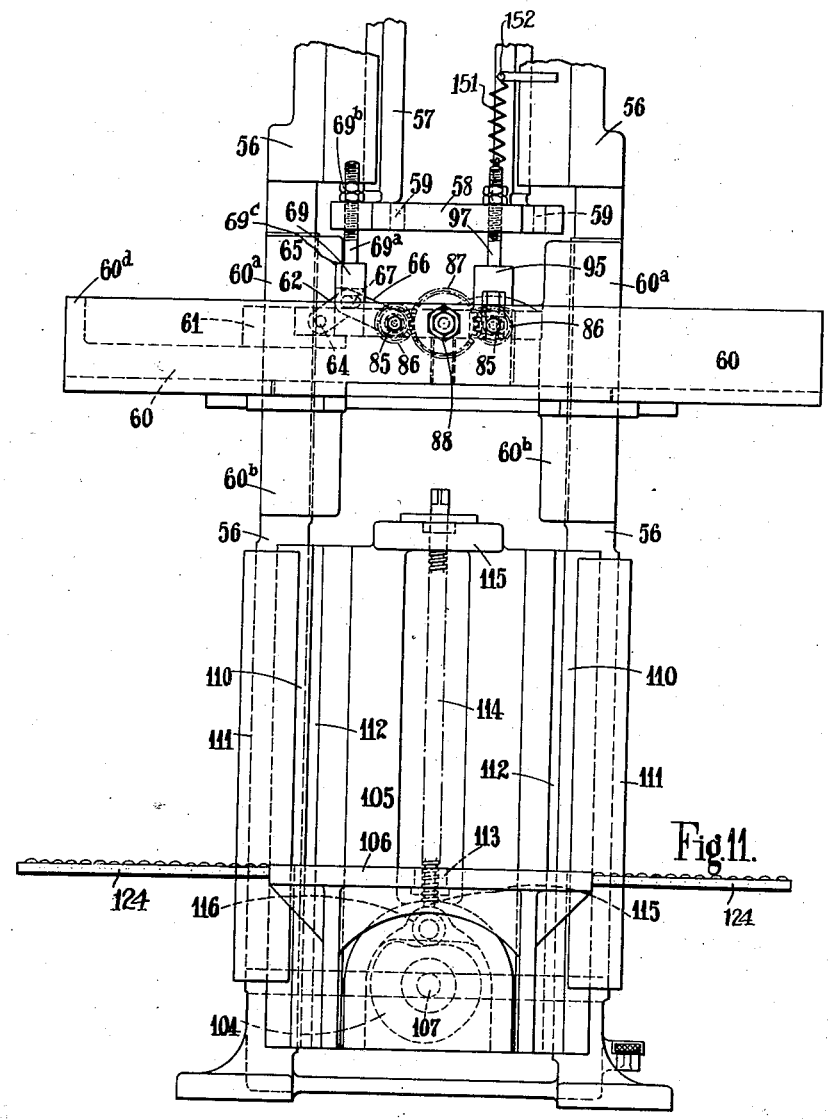

Figures 10 and 11 are side and front elevations of a power-operated press according to the invention, the upper part comprising the gearing for actuating the press head being omittted as this is arranged according to standard practice.

Figure 12 is an elevation mainly in section of the form of tool or closing device adapted for power-operation.

Figure 13 being a corresponding plan.

Figures 14 and 15 are side and front elevations of the platform-raising mechanism.

Figure 16 is an elevation of a modified form of element for actuating the toggle mechanism.

Figures 17, 17a and 17b are views of a loading table that may be used in connection with the invention.

Figures 18, 19, 20 are diagrams illustrating the arrangement of the jaws for closing cases of circular, elliptical and hexagonal cross section respectively.

Figures 1, 1A:
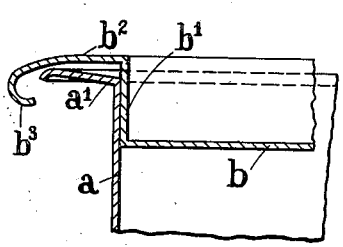
Figures 1, 1a and 1b are diagrams illustrating various steps in the operation of the improved method according to one form.

In carrying the invention into effect as applied to the packing of tin plates, terne plates, black plates and the like, in which the end-pieces of the container are fastened to the body portion by an outwardly formed roll, which is subsequently flattened or planished, the body portion comprising suitable sheet metal of suitable ductility, is formed as a tube rectangular in cross section, the corners being rounded to a convenient radius. The tube is preferably formed from a single sheet, the join extending parallel to the axis of the tube and preferably along one of the narrow sides thereof. This join is preferably formed by overlapping the adjacent edges and electrically welding or soldering them together. It may, however, be formed by side-seaming the edges together. The marginal edges $a'$ (see Figure 1) of the ends of the tube $a$ thus formed are bent outwardly at an external angle of say 100° with the remainder of the body portion by any suitable method to form an outwardly extending continuous flange, the edge of which may be tipped downwardly. This flanging may be effected prior to the tube forming operation.

It is desirable that, but for a slight tipping or bending along its outer edge, the flange $a'$ should be formed as a plane surface, and should be joined to the body portion by a sharp bend or plane angle (and not by a curve of appreciable radius) to avoid permitting the metal in the flange to flow or creep, during and in consequence of the roll-forming operation, towards the body portion of the container, and thereby tend to force the body portion downwards and cause it to buckle.

The end-pieces of the container are stamped out of similar sheet metal and are rectangular in shape, the corners being rounded to a convenient radius.

In cross section in both directions, the end-pieces comprise a main central portion $b$, the extremities of which extend upwardly as at $b'$ at an angle slightly greater than a right angle and then outwardly parallel to the main portion, as at $b^2$, the extremity of the outwardly extending portion being curved downwardly and terminating in a groove or curl $b^3$ of substantially semi-circular cross section.

The preparation of the end-piece may be effected in any convenient manner. For example, it is found convenient to effect it in three steps or operations. In the first the end-piece is stamped out of a flat plate to produce the recessed centre part $b$, $b'$, surrounded by a flange parallel to the part $b$. In the second step the outer part of this flange is bent downward while in the third step the lower portion of this part is curved to form the curl $b^3$.

It will be appreciated that the dimensions and clearances shown in the figures are exaggerated for clearness.

Figure 2:
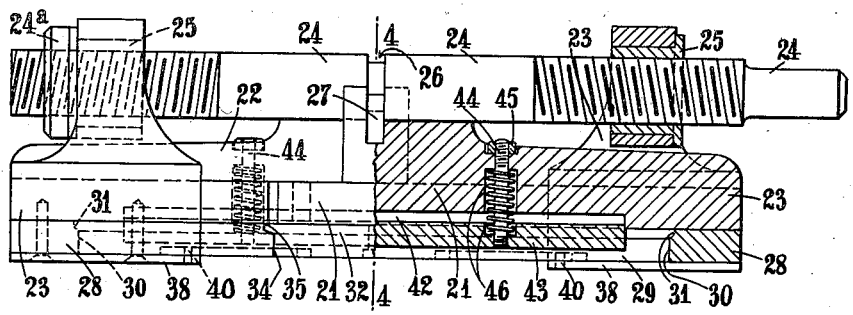
Figure 2 is an elevation partly in section of one form of apparatus adapted for manual operation according to the invention.
Figure 3:
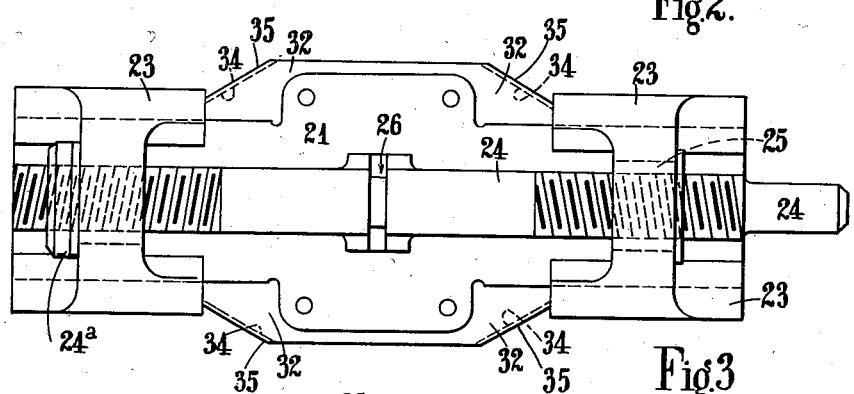
Figure 3 is a corresponding plan.
Figures 4, 5C, 5D:
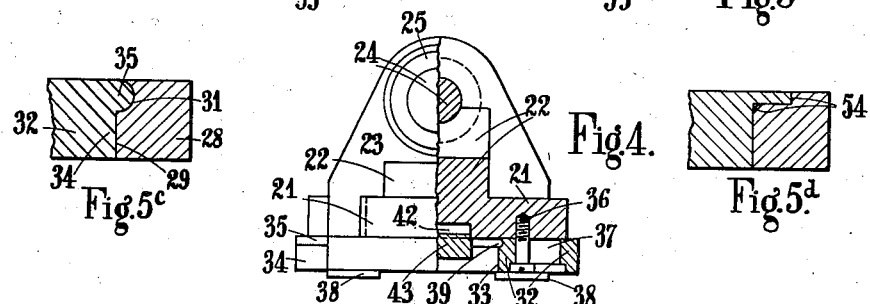

The dimensions of the flanged parts will be such as to provide the necessary amount of metal correctly to form the roll. The end-pieces are adapted to be inserted into the ends of the body portion, the dimensions being such as to provide a fairly tight fit. An end-piece having been inserted into an end of a body portion the edges or flanges of the end-piece and of the body portion rolled together simultaneously on all sides by means of the roll-forming tool hereinafter described, see Figure 2.

Figure 1B:
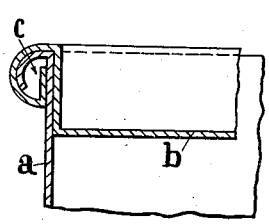

The roll $c$ (Figure 1a) thus formed is then flattened or planished to provide a flattened seam $c'$ (see Figure 1b) with the parts of the end-piece and body portion forming the seam closely pressed together and against the body portion. The joint so formed may be sufficiently tight to form a substantially air-tight joint, or the joint may be soldered. Alternatively, the groove surrounding the recess in the end piece may be covered with a suitable sealing composition, preferably one having a rubber base, before the rolling is effected.

Turning now to Figures 2–5, which illustrate a hand-operated tool for carrying out the method, it will be convenient to describe certain parts relatively to a vertical axis.

The tool comprises a base 21 which extends laterally on either side and perpendicularly to the axis, and is adapted to be bolted to a vertically displaceable rod, or plunger, whereby the tool may be moved upwards or downwards into the working position and away from the work as desired.

The base may be provided with central rib portions 22 for obtaining the necessary strength.

Mounted on the base to slide in a direction at right angles to the vertical axis is a pair of sliders 23 which engage suitable guiding faces on the base 21. These sliders are adapted to be moved inwardly toward one another, and for this purpose an operating spindle 24 is provided, having right and left hand threaded portions, which engage respectively in threaded bushes 25 carried by the sliders. The threads are of suitable coarse pitch, and may be multi-start threads, the arrangement being such that on rotating the operating spindle by means of a hand-wheel or lever, the sliders 23 are moved inwardly toward one another, the reverse movement of the hand-wheel or lever causing them to move outwardly.

In order to prevent longitudinal movement of the operating spindle 24, the latter is provided with a groove 26 into which a key 27 carried by the base 21 is seated. Outward movement of the sliders at the appropriate point may be terminated by a stop which may comprise a collar 24a threaded onto the operating spindle and pinned or locked thereon in the appropriate position by set screws or otherwise.

The sliders 23 on their lower face carry end jaws 28 which on their inner faces are provided with notches $n$ Figure 5b, which in plan are of truncated triangular shape. The slant sides 29 of the notch are arranged at 30° to the axis of the operating spindle as seen in plan, while the end 30 of the notch is at right angles to such axis, the sides and end being joined by curves of suitable radius which conform to the curve of the corner of the container, the slant sides 29 of the notch being tangent to such curves as seen in plan. The lower portions of the inner working faces of the jaw are parallel to the vertical axis and immediately above such lower portions and adjacent the face of the slider are provided with a roll-forming groove 31 which is of suitable dimensions and shape, for example, semi-circular in cross-section. A groove similar to, and in continuation of, the roll-forming groove, is formed along the whole length of the slant sides of the end jaws immediately above the vertical inner faces of those slant sides.

Between the end jaws is a pair of side jaws 32 which are adapted to be moved inwardly along a path at right angles to the path of motion of the end jaws 28. These side jaws are of truncated triangular shape in plan, the bases 33 of the triangles being located inwardly while the slant sides 34 are arranged at an angle of 30° with the axis of the operating spindle (as seen in plan). The dimensions of the side jaws are such that the slant sides 34 thereof engage the slant sides 29 of the notches of the appropriate end jaws 28. The slant sides of the side jaws are provided with beads 35 which engage in the grooves 31 in the slant portions of the notch walls of the end jaws, see Figure 5c. The side jaws engage the under surface of the base 21 of the tool and are kept up to such surface by the provision of flatheaded screws 36 engaging in suitable slots 37 in each of the side jaws and by the engagement of the beads 35 in the slant sides of the side jaws with the grooves 31 in the slant sides of the notches in the end jaws.

The end portions of the side jaws are kept in engagement with the base of the tool by means of plates 38 hereinafter referred to as "peg plates" which are screwed or otherwise fastened to the under surface of the end jaws 28. The lower portions of the inner walls, or operative surfaces 33, of the side jaws are parallel to the vertical axis and the upper portions are provided with roll-forming grooves 39 corresponding to those in the end jaws. It will be appreciated that on moving the end jaws 28 inwardly toward one another, the engagement of their slant surfaces 29 with the slant surfaces 34 of the side jaws will cause the side jaws to move inwardly, the relative rate of movement depending upon the angle of the inclined or slant sides. In this connection it has been found that an angle of 30° as above referred to is suitable. Any other suitable angle, however, may be adopted.

The outward movement of the side jaws 32 may be effected in any suitable manner and according to a convenient arrangement pins or pegs 40 are provided on the peg plates 38 and such pegs engage in grooves 41 in the surface of the side jaws, such grooves being arranged parallel to the slant walls of the side jaws, that is at 30° to the axis of the operating spindle. It is important that whatever means may be adopted the four jaws must always move so that the slant sides of the side jaws are in sliding contact and engagement with the corresponding surfaces of the slant sides of the end jaws.

In the under surface of the base of the tool and located inwardly of the jaws, a recess 42 is provided in which a movable chuck or former 43 is located. This chuck is adapted to move parallel to itself relatively to the base along the vertical axis, and is guided by guide rods 44 screwed into the chuck and extending through apertures in the base, nuts being provided to limit the movement of the chuck away from the bottom of the recess. The arrangement is such that the chuck 43 cannot come completely out of the recess 42. The thickness of the chuck is such that when it contacts with the bottom of the recess it projects beyond the face of the base a distance equal to the amount by which the central portion $b$ of an end-piece is recessed below the surrounding flange $b^2$. Surrounding the guide rods 44 are compression springs 45 located in suitable recesses 46 in the chuck and base. The chuck is of rectangular form with rounded corners to correspond with the recessed space $b, b'$ of the end-piece of the container and may be slightly tapered downwardly adjacent the lower face to provide a slight lead to facilitate centering and entry into the recessed end-piece. The corners of the chuck are rounded off in plan to a suitable radius corresponding to the radius which it is found desirable should obtain at the corners of the recess in the end-piece when the end-piece is connected to the body portion. The curved parts of the notches on the end jaws which are adapted when the jaw is at the inner limit of its working travel to lie concentric with the rounded off corners of the chuck are curved to a radius greater than the radiused corners of the chuck by the thickness of the rolled seam, as regards the roll-forming groove in the jaws, and by the thickness of the planished seam, as regards the planishing surface of the jaws.

In order to form a neatly curved smooth roll at the corners of the container the ends of the operative faces of the side jaws are formed with preferably integral extensions which are curved inwardly of the straight portion of the operative face, as indicated at X, Figure 6, so that they will merge into the curve of the curved part of the end jaws when the jaws are at the inner limit of their working travel, as indicated at Y, Figure 6a. By such arrangement a die or operative surface is provided comprising four straight portions 30, 30, 33, 33 connected by curves so that the surface is continuous, no gaps being present.

It will be appreciated that when the jaws are at the outer limit of their working travel these curved extensions X of the sides 33 of the side jaws will be tangent at their extremities to the slant sides of the notches in the end jaws, which sides are also tangent to the curved parts of the end jaws.

It is to be noted that the extensions or curved ends of the side jaws indicated by the reference X are formed both on the roll-forming groove portion and on the planishing portion of the die surface.

Further the continuous surface, comprising the operative portions of the jaws, is present at all positions of the jaws between the inner and outer limits of their working travel.

The tool may be lowered onto the work or raised upwardly to the work.

The tool may be mounted above a roller conveyor whereby the cases may be readily moved into position.

In operation the recessed end-piece is mounted to lie upon the end of the body portion and the tool lowered so that the chuck or former 43 is located within the recessed part $b$, $b'$, of the end-piece and in contact therewith. The pedal lever is inserted into the notch corresponding to the lower position of the tool to hold the parts in position. In this position the chuck 43 is forced into the recess 42 in the body of the tool leaving a part of the chuck projecting from the recess and in alignment with the roll-forming groove 31, 39 on the jaws. The jaws are then moved inwardly by manipulation of the operating spindle 24 whereby the roll-forming grooves in the jaws engage the flanges or margins of the end-piece and body portion and roll them together.

The jaws are then retracted and the tool raised to the position corresponding to the second hand lever or pedal notch. In this position the chuck 43 is forced outwardly from its recess by the compression springs 45 so that the face of the chuck still remains in pressure contact with the end-piece and the edges of the chuck lie in the plane of the planishing walls of the jaws with the completed roll intervening between the chuck and the plain or planishing walls of the jaws. The jaws are again moved inwardly to flatten or planish the roll whereby the parts thereof are closely pressed together.

With the form of chuck shown in connection with the hand-operated tool it will be appreciated that the tool is limited in its use to containers having end-pieces of similar size and form. In order, however, to adapt it to a number of sizes a modified arrangement of chuck may be applied thereto as hereinafter described with reference to a power-operated form of machine.

It will be noted that by the formation of the ends of the working surfaces 33 of the side jaws with curved extensions, X, the roll will be continuous all round the container and uniform in section on curves and straight portions and the corners will be neatly rounded off.

In some cases, however, it may not be necessary to provide such neat corners and thus the working faces 33 of the side jaws may be straight throughout as indicated in the detail Figure 7a, in which case the corners of the chuck or anvil would have slight projections extending beyond the true circle as indicated at Z, Figure 7, and so positioned and shaped as to cause the planished roll to fill up the space bounded by the normal curve of the corner of the container, the straight portion of the side jaw replacing the curved portion of that jaw and the slant portion of the end jaw so far as exposed in closed position of the jaws by the substitution of a straight end to the operative face of the side jaw instead of a curved end. Where a less perfect corner would satisfy, the projection Z on the chuck could be dispensed with entirely.

While with a metal of suitable ductility the flanging of the tubular body portion will result in a suitable thinning of the metal at the corners, which will aid in the formation of the roll, it may be desirable, more particularly in connection with the tubular body portion, to cut in the corners nicks of suitable shape and size.

In the modified arrangement in which the roll-forming step is dispensed with, the flange $a^3$ (Figures 8, 8a, 8b, 8c) on the ends of the tubular body portion $a^4$ is bent outwardly at suitable angles, say 100°, to the walls of the body portion.

The end-pieces, in cross section in each direction terminate in grooves formed by a wall $b^4$ at slightly more than a right angle to the main part $b^5$, then an outward extending wall $b^6$ parallel to the main part and finally a downwardly extending wall $b^7$.

When the end-piece is located in the end of the body portion and pressure applied thereto by the tool, the flange $b^6$ is pressed into contact with the flange $a^3$, bending the latter downwardly so that the two flanges lie closely in contact with each other. The downwardly extending wall $b^7$ of the end-piece is next bent inwardly to lie beneath and parallel to the flange $a^3$ of the body portion. The triple flange $b^7$, $a^3$, $b^6$ is then bent downwardly by vertical pressure to an angle of about 45° with the body portion and finally by a further lateral pressure is bent and pressed or planished flat against the wall of the body portion.

In order to effect these steps the tool above described is modified as follows—

The chuck 47 (Figure 9) is fixed to or formed in one with the base 48 of the tool. A depression frame 49 which may be of square or rectangular section is located within a groove 50 surrounding the chuck but uniformly spaced therefrom at a distance equal to about half the width of the flange $a^3$ around the body portion of the container. The inner lower edge of the frame is preferably radiused to facilitate the frame sliding over the flange. This frame 49 is adapted normally to lie within its groove with its lower surface flush with the lower surface of the base of the tool but to be projected partially therefrom at the appropriate time. For this purpose the frame is provided with a number of parallel guiding pins 51 which project upwardly through apertures in the base of the tool, and are connected above such base to a pressure plate 52. Compression springs 53 surrounding the pins and located between the pressure plate and the base act to maintain the depression frame within its groove.

The projection of the depression frame from its groove may be effected by cams mounted freely upon the central plain portion of the screwed operating spindle, which cams may engage rollers 150 carried by the pressure plate on its upper surface.

Instead of the working faces of the jaws being provided with roll-forming grooves, these are rabbeted at the upper edge thereof to form grooves or spaces 54 between the main portions of the operative faces of the jaws (as the bottom of the grooves) and the base of the tool (as the top of the grooves), so that, when the jaws are in their inner working position, a continuous groove is formed all around the jaws.

Grooves similar to those in the end jaws are continued along the whole length of the slant sides of the end jaws.

Along the slant sides of the side jaws are ledges which fit, fill and slide in the grooves in the slant sides of the end jaws, just as in the first described form the beads on the slant sides of the side jaws fit, fill and slide in the grooves in the slant sides of the end jaws, so that, in all positions of the jaws the inner grooves and vertical working faces are continuous all round the jaws, the curves, in plan, on the jaws being joined when the jaws are in any position other than at the inner limits of their working travel by the common tangents thereto formed by the slant side of the end jaws. The shape of the chuck and of the side jaws may be modified where a less perfect corner will suffice as explained in relation to the first described method.

The upper edges of the main portions of the operative faces of the jaws may be rounded off in cross section to a small radius (say ⅛") to facilitate the entry of the flange to be formed on the body portion of the container into the groove.

In connection with this form of apparatus the vertically displaceable rod carrying the tool only requires moving to a single operative position by its pedal or the like, and is temporarily held in such position by a notch or other device.

It is to be noted that Figure 9 is diagrammatic and only the essentials are illustrated therein. Thus the jaws may be maintained in position and actuated in a similar manner to that in which the first described form of tool is maintained in position and actuated.

In operation, the end-piece being located in position on the body portion, the tool is lowered until the chuck or former 47 engages the inner plane part of the end-piece and in pressure contact and so that the flange $a^3$ on the body portion of the container which previously tended upwards and outwards is pressed down by the tool until it is at right angles with the walls of the body portion $a^4$ and in pressure contact with the end-piece so that the groove surrounding the end-piece and opposite edges of the flange lie in one plane and opposite to the groove 54 in the jaws. The tool is held in this position by engagement of the pedal lever in the notch. The operating spindle is then actuated, causing the jaws to move inwardly so that the inner vertical faces 55 etc. engage the downwardly extending margins $b^7$ of the end-piece causing them all simultaneously to be bent up horizontally beneath the flange $a^3$ of the body portion.

The jaws are then retracted and the depression frame 49 lowered to engage the triple flange and bend it downwardly say to about 45° after which the depression frame is raised to a position entirely within the groove in the base. The jaws are now again moved inwardly and the inner vertical faces 55 engage the triple flange and force it down to engage the walls of the body portion, the pressure of the jaws being resisted by the chuck or anvil whereby the flange is compressed or planished against the body portion of the container to form an air-tight or substantially air-tight joint.

It will be understood that both end-pieces may be fastened on the tubular body portion by the methods above described (the second end-piece being fastened after inserting the goods) and it may be found desirable in the case of the first end-piece to arrange the work above the tool.

Reference will now be made to Figures 10–15 which illustrate, by way of example, the carrying out of the invention in connection with a power-operated machine.

The press comprises a standard or frame 56 carrying a suitable known type of drive and gearing (not shown) whereby the head 57 is vertically reciprocated. The head carries a horizontal flange 58 part of which is located between parts of the frame. The flange 58 is pierced by six holes 59 which are disposed symmetrically one on either side of the vertical axis of the head and two at the front and two at the rear thereof. These holes are adapted to accommodate bolts whereby toggle mechanism is operated as hereinafter described.

Mounted below the head flange and adjustably supported by the frame 56 is the tool box 60 which carries the roll-forming jaws and toggle mechanism for operating them. The tool box is cross-shaped in plan, one arm extending as shown in Figure 13 rearwardly between the arms of the standard 56. The forward and right arms which are broken away in Figure 13 correspond respectively with the rear and left arms as shown in such figure. Vertical extensions 60a, 60b of the tool box embrace the standard 56 whereby the tool box is rigidly held in position.

The tool box is adapted to be adjusted vertically by any known means and locked in its adjusted position.

The tool box is formed with a base or main casting 60c surrounded by a vertical flange 60d providing shallow depressions or cavities in which the toggle mechanisms are located.

Referring first to the mechanism for actuating an end jaw, a lug 61 extends upwardly from the base and forms an abutment for a forked block 62 which is held up to the lug by a bolt 63. The forked block carries a pin 64 forming a pivot for the link 65 of a toggle. The other member of the toggle, comprising a pair of links 66, is pivoted by a pin 67 to the link 65. The pin 67 also engages in slots 68 in a vertically reciprocating forked block 69.

The links 66 are pivotally connected by a pin 70 to a block 71 which is adapted to slide between guides whereby it is constrained to move along the longitudinal axis of the tool box and thus guide the movements of the toggle.

The pin 70 also forms a connection between the toggle arm 66 and a pair of outwardly extending eye or pull rods 72 the outer ends of which are screwed and extend through lugs 73 integral with a sliding block 74 adapted to slide between guides forming part of the tool box casting whereby it is constrained to move along the longitudinal axis of the tool box. The rods 72 are screwed for a considerable distance whereby adjustments within relatively wide limits are possible. Lock nuts 72a are provided for maintaining the relative positions of the rods and lugs when adjustment has been effected.

It will be appreciated that by vertically displacing the pin 67 of the toggle by the block 69 the sliding block 74, through the rods 72, will be moved in or out relatively to the vertical axis.

In order to effect these movements, the block 69 is provided with an upwardly projecting screwed stem 69a which extends through the appropriate hole 59 in the flange 58. Lock nuts 69b are provided above the flange 58 whereby on raising the latter the toggle pin 67 is raised with a consequent outward movement of the sliding block 74. The connection between the flange 58 and the block 69 is thus in the nature of a lost motion coupling. On lowering the flange there is first a period of lost motion until the flange engages the upper surface 69c of the block 69 which is then forced downwardly and operates the toggle and causes an inward movement of the sliding block 74.

The toggle-block stems may be connected at their upper ends (see Figure 11) to tension springs 151 which are also attached to brackets 152 on the main casting of the press-head or other relatively stationary part. These springs act to pull the toggle-block stems upwards and thus keep the jaws at the outer limit of their working travel so long as the toggle blocks are not depressed by the flange 58.

The sliding block 74 is rigidly connected by bolts 75 passing through slots 76 with a casting 77 which slides upon the under face of the base 60c, suitable guides 177 being provided to maintain the correct position thereof. The casting 77 is provided with a lug 78 forming an abutment for the end jaw 79 which is bolted to the casting 77.

The other end jaw 80 is mounted and actuated by similar toggle mechanism associated with the block 81. The jaws 79 and 80 are provided with roll forming grooves 79a and 80a respectively. Also the jaws are provided with planishing surfaces 79a and 80b.

Motion is imparted to the side jaws 82 similarly by means of toggles actuated by the head flange 58. The length of the side jaws, however, renders necessary certain modifications. For example, it is necessary owing to the length of the side jaw to apply the force to at least two points in that length.

In the construction illustrated two toggle movements which are arranged in parallel are shown as operating such side jaw. Each toggle is linked to an adjustable forked block 83 which may slide between suitable guide surfaces. The block 83 is held in its adjusted position against the end of a screwed bolt 84 by means of an axially arranged bolt 85. The bolts 84 are provided with pinions 86 meshing with a common spur wheel 87 which has an hexagonal boss 88 whereby it may be rotated by a spanner. Lock nuts 89 are provided for locking the bolts 84 in their adjusted position.

The link 90 of the toggle is connected to the forked block 83 by a pin 91. The other links of the toggle comprising the members 92 are pivotally connected to the link 90 and to a vertically movable forked block 93 by a pin 94 which engages in elongated slots in the block 93. The links 92 are further pivotally connected by a pin 192 to a sliding block 95 which is mounted between guiding surfaces 195 whereby it is constrained to move in a path at right-angles to the longitudinal axis of the tool box.

The sliding blocks 95 are connected to a casting (similar to 77) which is located beneath the surface of the tool box and carries the side jaw 82.

The forked blocks 93 are provided with screwed stems 97 which engage in appropriate holes 59 in the flange 58 in a manner similar to the blocks 69.

Similar arrangements are provided for actuating the other side jaw.

The opening between the inner edges of the castings 77 etc. carrying the end and side jaws is a little more than is required for the largest container to be operated upon by the apparatus. In order to permit the use of the tool for smaller containers a rectangular adapting frame 98 is provided which fits between the jaws and the surface of the base (see Figure 12) and is fixed by screws 198 to the base 60c. The inner adapting frame surrounds the chuck 100 and the inner surfaces of the frame are rebated to provide a continuous ledge 99 which is adapted to support the chuck or former 100 which is provided with a co-operating projection or flange 101. The chuck or former is provided with recesses 102 accommodating springs 103 by which it is pressed downwardly against the ledge 99 until the chuck 100 comes into pressure contact with the end of a container, when the pressure of the springs is exerted, through the chuck, upon the container.

In adapting the tool to operate upon smaller containers the jaws 79, 82 are removed by unbolting from the castings 77 etc. The chuck 100 and adapting frame 98 are then removed and replaced by another frame and chuck of the appropriate sizes. The outer dimensions of the adapting frames may all be the same, the inner dimensions varying with the appropriate chucks. A suitable set of jaws is then mounted in position.

It is found convenient in cases where the end and side jaws are independently operated by power other than hand-power to arrange the co-operating sliding surfaces of the jaws at an angle of 45° with the direction of motion of the jaws.

The work is raised upwardly to engage the tool by a cam 104 which engages a roller 116 carried by a vertically guided frame or work slide 105 to which the platform 106 is adjustably connected. The cam is mounted on a cam shaft 107 driven by bevel gear 108 from a vertical shaft 109 which is geared to the mechanism for driving the cranks or eccentric actuating the press head 57. The gearing is so arranged that during one revolution of the cam the head 57 makes two working strokes.

The work slide is guided on the frame 56 by the side cheeks 110 which are engaged by guiding strips 111. Slots 112 for T-headed bolts are provided in the side members 110 by which the platform is rigidly bolted to the work slide, while permitting relative adjustment in a vertical direction.

This relative adjustment of the platform is for the purpose of accommodating containers of different height. The platform is provided with a nut member 113 engaging a screw 114 mounted in bearings 115 on the work slide 105. The upper end of the screw is squared for the reception of a spanner.

The platform is provided with a pair of spaced guides 136 which are bolted thereto by means of T bolts engaging in undercut grooves in the platform. The distance between the guides is just sufficient to permit the insertion of a container (about to be closed) therein. A pivoted latch 117 is provided for locating the container in its correct position, the latch being removable so that the container when operated upon may be pushed completely through the guides, after which the latch is replaced for the reception of a fresh container. The height of the guides is such that the container will project above them sufficiently to allow the closing jaw to operate without fouling the guides.

The cam 104 has three working positions. At the lowest as seen in Figure 15, the container to be closed is pushed into position between the guides and under the tool. The cam then lifts the container into the roll-forming position where it is held stationary whilst the jaws move inward to form the roll and again outwards to a position free of the roll. The cam then allows the container to be lowered by gravity into the planishing position and while held stationary in such position the jaws again move inwards to planish the roll and then outwards to become free of the container. The cam then allows a lowering of the container and is preferably shaped to permit the platform being stationary long enough to permit the container to be removed and another inserted into position. The motion of the cam may be continuous or intermittent as desired.

To facilitate moving the container which when filled may weigh 2 cwts., it is preferred to provide a conveyor such as a roller conveyor 124, Figure 11 located upon both sides of the platform so that containers may be readily moved by hand. This it will be appreciated may cause difficulties when it is desired to adjust the platform for different heights of containers.

In order to avoid these difficulties the platform may be maintained at a uniform normal level agreeing with the level of the conveyor and means provided for the vertical adjustment of the tool box instead. In order that this may be accomplished, however, it is necessary to provide some modification in the connection between the press head and the means for actuating the toggles so as to overcome the difficulty of the press head actuating devices being at a constant level.

Referring to Figure 16 the blocks for actuating the toggles are provided with screwed stems 118 which are sufficiently long to permit adjustment for all lengths of containers. A screwed sleeve 119 having a shoulder 120 is provided, the length $x$ of the sleeve being equal to the idle travel of the press head plus the thickness of the flange thereof. A nut 121 forms an upper shoulder for the sleeve and lock nuts 122 are provided for holding the sleeve in its adjusted position on the stem 118. It will be understood that the sleeve engages in one of the holes in the flange of the press head and the toggles are actuated by the engagement of the flange with the shoulder 120 or nut 121. By adjusting the sleeve along the stem accommodation will be afforded for vertically adjusting the position of the tool box.

The power-operated apparatus may be adapted to the form of the invention in which no rolling of the flanges occurs as described with reference to Figure 9. In such case, however, it would only be necessary to provide for two positions of the platform, an upper working position and a lower position for the reception and discharge of the containers.

In connection with the roller conveyor 124 on which the containers are carried to the machine, whether hand or power operated, it may be desirable to provide means to facilitate the filling of the containers. Thus, referring to Figures 17, 17a, 17b a filling flap 140 may be pivotally mounted on a bar 123 located on one side of the conveyor 124.

The filling flap is provided with fingers 125 on which the container rests while in the filling position as indicated in Figure 17b. When the flap is pivoted into an upright position to discharge a filled container the fingers are adapted to lie below the surface of the rollers 126 so that the filled container will then be supported by the conveyor. The filling angle of the flap, varying according to the size of container, may be varied by adjusting the bar 127 into the appropriate slots of the brackets 128.

It is to be understood that whatever means be adopted for operating the jaws, whether for hand or power, the slant surfaces of the jaws must always be arranged to move in mutual contact.

When the jaws are to be actuated by power, the slant surfaces may conveniently be arranged at an angle of 45° although clearly any other suitable angle may be utilized.

While in the above detailed description a container of rectangular cross section suitable for tin plates or the like has been referred to, it is to be understood that the improved methods and apparatus may be applied to the closing of ends of packings of other polygonal shapes comprising a plurality of sides preferably joined by curves.

They may even be adapted to the closing of containers of circular or elliptical cross section. The arrangement of the jaws for a container of circular cross section is diagrammatically illustrated in Figure 18 in which it will be seen that the common slant surface between the pair of end jaws 129 and side jaws 130 are tangential to the roll-forming parts 131.

Similarly in connection with containers of elliptical cross section as will be seen in Figure 19, the slant surfaces 132 are tangential to the curved parts 133 on the respective jaws.

Figure 20 diagrammatically illustrates an arrangement of two pairs of jaws 134, 135, for dealing with containers of hexagonal shape in cross section. Although shown in this figure as sharp angles, it will be understood that the angles between the adjacent sides preferably should be rounded off with a suitable small curve.

While the methods and apparatus above described are primarily concerned with containers for tin plates or the like it is to be understood that they may be applied to containers for any other articles or substances which may be in lump, crystalline, powder, paste or liquid form. Moreover, the nature and thickness of the material from which the container is made may vary according to the nature of the article or substance to be packed and the quality of the packing required. In this connection it will be noted that the method of closing according to the invention is carried out without pressure upon the contents, an advantage which is material when dealing with substances just specified. Also the invention may be applied to containers of all sizes and shapes in cross section which comprise what has been termed a tubular body portion and end-pieces connected thereto according to the methods described.

What is claimed is:

1. A tool for attaching an end-piece to the body portion of a container of the type described, wherein a double seam is formed outwardly of the plane of the walls of the container comprising a plurality of pairs of work-engaging jaws having operating surfaces the jaws of each pair being oppositely disposed one to the other, adjacent jaws having surfaces in sliding engagement with one another, whereby a continuous operating surface is provided in all positions of the jaws, and means for moving the jaws inwardly to form a seaming or folding operation, the inward movement of the opposed jaws in each pair being along their common axis.

2. A tool for attaching an end-piece to the body portion of a container of the type described, wherein a double seam is formed outwardly of the plane of the walls of the container, comprising a pair of side jaws and a pair of end jaws all having operating surfaces, adjacent jaws having surfaces in sliding engagement with one another, whereby a continuous operating surface is provided in all positions of the jaws, one pair of the jaws being of notched formation and the ends of the other pair of jaws lying within the notch adjacent such ends, and means for moving the jaws inwardly to perform a seaming or folding operation.

3. A tool as claimed in claim 1, comprising a pair of end jaws and a pair of side jaws and means for positively and simultaneously moving each jaw toward or from the other jaw of that pair along said common axis.

4. A tool as claimed in claim 1, comprising a pair of end jaws and a pair of side jaws, the end jaws having surfaces inclined to the direction of movement thereof, the side jaws having surfaces complementary to and engaging the inclined surfaces of the end jaws, and means for moving the end jaws toward or away from one another to cause corresponding movements of the side jaws through the engagement of the inclined surfaces.

5. A tool for attaching an end-piece to the body portion of a container of the type described, wherein a double seam is formed outwardly of the plane of the walls of the container, comprising a pair of end jaws and a pair of side jaws adapted to be moved inwardly towards one another, the end jaws having surfaces inclined to the direction of movement thereof, the side jaws having surfaces complementary to and engaging the inclined surfaces of the end jaws the side jaws having grooves parallel to the inclined surfaces, means for moving the end jaws toward and away from one another to cause corresponding movement of the side jaws through the engagement of the inclined surfaces, and projections operatively connected to the end jaws and engaging grooves in the side jaws to cause outward movement of the side jaws.

6. A tool as claimed in claim 5, wherein the projections comprise pins carried by peg plates by which the side jaws are retained in position.

7. A tool as claimed in claim 1, wherein a former is located inwardly of the jaws to form an abutment against which the jaws act in forming or planishing the double seam.

8. A tool as claimed in claim 1, wherein a former is located inwardly of the jaws to form an abutment against which the jaws act in forming or planishing the double seam, and wherein the working faces of the jaws are formed with roll-forming grooves and adjacent planishing surfaces.

9. A tool as claimed in claim 1, wherein a former is located inwardly of the jaws to form an abutment against which the jaws act in forming or planishing the double seam, and wherein the working faces of the jaws are rebated to form a groove or recess and a flange bending and planishing portion.

10. A tool as claimed in claim 1, wherein a relatively fixed former is located inwardly of the jaws to form an abutment against which the jaws act in forming or planishing the double seam, and wherein the former is surrounded by an axially movable depression frame, and means for lowering the frame to bend the flanges of the end-piece and body portion downwardly toward and at an angle with the body portion.

11. A tool as claimed in claim 2, adapted for containers of rectangular shape in cross-section having curved corners, wherein the operative faces of the side and end jaws are formed with curved portions which coincide or merge into one another to form a continuous curved wall concentric with the curved corner of the container (when the jaws are at the inner limit of their working travel) such curves being also tangent to the appropriate mutual sliding surfaces between the jaws.

12. A tool as claimed in claim 1, wherein a former is located inwardly of the jaws to form an abutment against which the jaws act in forming or planishing the double seam, said former being mounted for limited movement in an axial direction relatively to the plane of the jaws.

13. A tool as claimed in claim 1, wherein a former is located inwardly of the jaws and is mounted for limited movement in an axial direction relatively to the plane of the jaws, said former being provided with a flange which engages a ledge on a surrounding adapting frame which is removably secured to the tool, whereby said frame and former may be removed and others of different size secured in position.

14. A tool as claimed in claim 1, comprising a pair of end jaws and a pair of side jaws, and wherein the inward and outward movement of the end jaws is effected by an operating spindle having right and left-hand threaded portions engaging nuts in sliders to which the jaws are attached.

15. A press for use in attaching end-pieces to the body portions of containers of the type described, and provided with a tool of the type set forth having a plurality of pairs of work engaging jaws, the jaws of each pair being oppositely disposed one to the other and toggle mechanism for operating the jaws, comprising a vertically reciprocating head, lost motion couplings between the head and the toggle mechanisms, and a platform for the container located beneath said tool.

16. A press as claimed in claim 15, wherein cam means are provided for raising the platform to engage a container mounted thereon with the tool.

17. A press as claimed in claim 15, wherein the platform is adjustably mounted upon a work slide, screw operated means for adjusting the platform relatively to the work slide and cam means engaging the work slide to raise the platform to engage a container mounted thereon with the tool.

18. A press as claimed in claim 15, wherein means are provided for vertically adjusting the tool to accommodate different lengths of container, the lost motion couplings being adjustable as to their effective length.

19. A press as claimed in claim 15, wherein cam means are provided for raising the platform to engage a container mounted thereon with the tool, means for rotating the cams, means for reciprocating the press-head, and a driving transmission between said means having a 1:2 ratio, whereby during one revolution of the cam the press-head makes two working strokes.

DAVID GEORGE.